(12) United States Patent
Shiota (10) Patent No.: US 7,646,939 B2
(45) Date of Patent: Jan. 12, 2010

(54) ELECTRONIC ALBUM EDITING SYSTEM, ELECTRONIC ALBUM EDITING METHOD AND ELECTRONICS ALBUM EDITING PROGRAM

(75) Inventor: Kazuo Shiota, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 709 days.

(21) Appl. No.: 11/362,830

(22) Filed: Feb. 28, 2006

(65) Prior Publication Data
US 2006/0203103 A1   Sep. 14, 2006

(30) Foreign Application Priority Data
Feb. 28, 2005  (JP) .............................. 2005-053611

(51) Int. Cl.
*G06K 9/54*  (2006.01)
*H04N 5/76*  (2006.01)

(52) U.S. Cl. .................................. 382/305; 348/231.2

(58) Field of Classification Search ................ 382/305, 382/312; 348/231.2, 207; 715/202, 255; 358/537; 701/200
See application file for complete search history.

(56) References Cited
U.S. PATENT DOCUMENTS
6,111,586 A * 8/2000 Ikeda et al. ................. 345/619

2002/0044159 A1 * 4/2002 Kuroiwa et al. ............. 345/735
2002/0101539 A1 * 8/2002 Yokota ....................... 348/552
2007/0101247 A1 * 5/2007 Matsuki et al. ............. 715/500

FOREIGN PATENT DOCUMENTS
JP  2002-112165 A  4/2002

* cited by examiner

*Primary Examiner*—Kanji Patel
(74) *Attorney, Agent, or Firm*—Birch, Stewart, Kolasch & Birch, LLP (57) ABSTRACT

There is provided an electronic album editing system having a first storage section for storing a plurality of images captured by a user as an electronic album, a second storage section for storing each electronic album containing a plurality of images captured by cameramen other than the user by correlating with traveling routes of the cameramen of the images contained in the electronic albums, a traveling route calculating section for calculating a traveling route of the user in the plurality of images stored in the first storage section, an album detecting section for detecting an electronic album, out of the plurality of electronic albums stored in the second storage section, corresponding to a traveling route that presents a degree of coincidence of a reference value or more with respect to the calculated traveling route and an editing section for storing the images contained in the detected electronic album to the first storage section.

8 Claims, 10 Drawing Sheets

FIG. 1

| IMAGE | IMAGE CAPTURING TIME AND DATE | IMAGE CAPTURING POINT |
|---|---|---|
| IMAGE 200 | ○○○○ YEAR ○○ MONTH ○○ DAY ○○ TIME ○○ MINUTE ○○ SECOND | NORTH LATITUDE ○○° ○○' ○○" EAST LONGITUDE ○○° ○○' ○○" |
| IMAGE 210 | △△△△ YEAR △△ MONTH △△ DAY △△ TIME △△ MINUTE △△ SECOND | NORTH LATITUDE △△° △△' △△" EAST LONGITUDE △△° △△' △△" |
| IMAGE 220 | ×××× YEAR ×× MONTH ×× DAY ×× TIME ×× MINUTE ×× SECOND | NORTH LATITUDE ××° ××' ××" EAST LONGITUDE ××° ××' ××" |
| ... | ... | ... |

| ELECTRONIC ALBUM | IMAGE INFORMATION | | | TRAVELING ROUTE | CAMERAMAN |
|---|---|---|---|---|---|
| | IMAGE | IMAGE CAPTURING TIME AND DATE | IMAGE CAPTURING POINT | | |
| ELECTRONIC ALBUM 300 | IMAGE 302 | OOOO YEAR OO MONTH OO DAY OO TIME OO MINUTE OO SECOND | NORTH LATITUDE OO° OO' OO" EAST LONGITUDE OO° OO' OO" | STARTING POINT : NORTH LATITUDE °  '  " / EAST LONGITUDE °  '  " <br> RELAY POINT 1 : NORTH LATITUDE °  '  " / EAST LONGITUDE °  '  " <br> ... <br> RELAY POINT N : NORTH LATITUDE °  '  " / EAST LONGITUDE °  '  " <br> ENDING POINT : NORTH LATITUDE °  '  " / EAST LONGITUDE °  '  " | |
| | IMAGE 304 | △△△△ YEAR △△ MONTH △△ DAY △△ TIME △△ MINUTE △△ SECOND | NORTH LATITUDE △△° △△' △△" EAST LONGITUDE △△° △△' △△" | | CAMERAMAN 306 |
| | ... | ... | ... | | |
| ELECTRONIC ALBUM 310 | IMAGE 312 | ××× × YEAR ×× MONTH ×× DAY ×× TIME ×× MINUTE ×× SECOND | NORTH LATITUDE ××° ××' ××" EAST LONGITUDE ××° ××' ××" | STARTING POINT : NORTH LATITUDE °  '  " / EAST LONGITUDE °  '  " <br> RELAY POINT 1 : NORTH LATITUDE °  '  " / EAST LONGITUDE °  '  " <br> ... <br> RELAY POINT N : NORTH LATITUDE °  '  " / EAST LONGITUDE °  '  " <br> ENDING POINT : NORTH LATITUDE °  '  " / EAST LONGITUDE °  '  " | |
| | IMAGE 314 | □□□□ YEAR □□ MONTH □□ DAY □□ TIME □□ MINUTE □□ SECOND | NORTH LATITUDE □□° □□' □□" EAST LONGITUDE □□° □□' □□" | | CAMERAMAN 316 |
| | ... | ... | ... | ... | ... |
| ... | ... | | | | |

ELECTRONIC ALBUM EDITING SYSTEM, ELECTRONIC ALBUM EDITING METHOD AND ELECTRONICS ALBUM EDITING PROGRAM

CROSS REFERENCE TO RELATED APPLICATION

The present application claims priority from a Japanese Patent Application No. JP 2005-053611 filed on Feb. 28, 2005, the contents of which are incorporated herein by reference.

BACKGROUND OF THE INVENTION

1. Field of the Invention

The present invention relates to an electronic album editing system, an electronic album editing method and an electronic album editing program. More specifically, the invention relates to an electronic album editing system, an electronic album editing method and an electronic album editing program for editing an electronic album containing a plurality of images by adding images thereto.

2. Related Art

Digital cameras are rapidly spreading lately. Differing from a silver salt camera for recording an optical image of a subject by exposing on a film, the digital camera receives light of an optical image of a subject by using CCD and others and records it in a recording medium such as a flash memory as digital data. Then, utilizing the feature that the image captured by the digital camera is digital data, a technology for keeping a plurality of images altogether as an electronic album has been disclosed in Japanese Patent Laid-Open No. 2002-112165 for example.

Suppose a case when a user keeps a plurality of images as an electronic album and wants to edit the electronic album by adding images contained in another electronic album to user's own electronic album. In this case, the images to be added to the user's electronic album are desirable to be images related to the images contained in the user's electronic album, not images randomly sampled out of the other electronic album. However, no such method for editing the electronic album is provided in the conventional electronic album system as disclosed in Japanese Patent Laid-Open No. 2002-112165.

Accordingly, it is an object of the invention to provide an electronic album editing system, an electronic album editing method and an electronic album editing program which are capable of solving the above-mentioned problem. This object may be achieved through the combination of features described in independent claims of the invention. Dependent claims thereof specify preferable embodiments of the invention.

SUMMARY OF THE INVENTION

In order to solve the above-mentioned problem, according to a first aspect of the invention, there is provided an electronic album editing system having a first storage section for storing a plurality of images captured by a user as an electronic album, a second storage section for storing each one of a plurality of electronic albums containing a plurality of images captured by cameramen other than the user by correlating with traveling routes of the cameramen in the plurality of images contained in the electronic albums, a traveling route calculating section for calculating a traveling route of the user in the plurality of images based on an image capturing sequence and image capturing point of each one of the plurality of images stored in the first storage section, an album detecting section for detecting an electronic album, out of the plurality of electronic albums stored in the second storage section, corresponding to a traveling route that presents a degree of coincidence of a reference value or more set in advance with respect to the traveling route calculated by the traveling route calculating section and an editing section for editing the electronic album of the user by storing at least a part of the plurality of images contained in the electronic album detected by the album detecting section to the first storage section.

The editing section may edit the user's electronic album by storing images, among a plurality of images contained in the electronic album detected by the album detecting section, captured at points distant from image capturing points of all images stored in the first storage section by a preset distance or more to the first storage section. The album detecting section may detect one electronic album in the plurality of electronic albums stored in the second storage section when a degree of coincidence of a traveling route stored in the second storage section by correlating with one electronic album with a traveling route calculated by the traveling route calculating section is a reference value or more set in advance and a degree of coincidence of a period during which the plurality of images contained in one electronic album has been captured with a period during which the plurality of images stored in the first storage section has been captured is a reference value or more set in advance.

The electronic album editing system may further include a weight holding section for holding weights by correlating with each one of the cameramen in the plurality of electronic albums stored in the second storage section and a weight updating section for increasing, when the album detecting section detects one electronic album, the weight held by the weight holding section by correlating with the cameraman of the detected electronic album, wherein the album detecting section may detect, out of the weight holding section, the electronic album whose weight corresponding to the cameraman of each electronic album is largest among the plurality of electronic albums, stored in the second storage section, corresponding to the traveling route presenting the degree of coincidence of the reference value or more set in advance with respect to the traveling route calculated by the traveling route calculating section.

The electronic album editing system may further include a traveling route presenting section for presenting the traveling route calculated by the traveling route calculating section to the user and a traveling route change control section for changing the traveling route presented by the traveling route presenting section by an instruction from the user, wherein the album detecting section may detect the electronic album that corresponds to the traveling route presenting a degree of coincidence of the reference value or more set in advance with respect to the traveling route changed by the traveling route change control section out of the plurality of electronic albums stored in the second storage section.

The electronic album editing system may further include a first traveling period specifying section for specifying a traveling period during which the user traveled through the traveling route calculated by the traveling route calculating section from image capturing time and date further stored in the first storage section by correlating with an image, when the album detecting section detects a plurality of electronic albums corresponding to the traveling route presenting the degree of coincidence of the reference value or more set in advance with respect to the traveling route calculated by the traveling route calculating section out of the plurality of electronic albums stored in the second storage section, and a second traveling period specifying section for specifying a traveling period during which the cameraman traveled through the traveling route stored in the second storage section by correlating with an image contained in the electronic album detected by the album detecting section from image capturing time and date further stored in the second storage section by correlating with an image to record by correlating with the electronic album. Then, the album detecting section may detect the electronic album stored in the second storage section by correlating with the traveling route recorded by correlating with the traveling period specified by the second traveling period specifying section and closest to the traveling period specified by the first traveling period specifying section among the plurality of electronic albums detected by the album detecting section.

According to second aspect of the invention, there is provided an electronic album editing method for editing an electronic album containing a plurality of images, wherein a first storage section stores a plurality of images captured by a user as the electronic album and a second storage section stores each one of a plurality of electronic albums containing a plurality of images captured by cameramen other than the user by correlating with traveling routes of the cameramen in the plurality of images contained in the electronic albums, and the electronic album editing method may include a traveling route calculating step of calculating a traveling route of the user in the plurality of images based on an image capturing sequence and image capturing point of each one of the plurality of images stored in the first storage section, an album detecting step of detecting an electronic album corresponding to a traveling route that presents a degree of coincidence of a reference value or more set in advance with respect to the traveling route calculated in the traveling route calculating step out of the plurality of electronic albums stored in the second storage section, and an editing step of editing the electronic album of the user by storing at least a part of the plurality of images contained in the electronic album detected in the album detecting step to the first storage section.

According to a third aspect of the invention, there is provided an electronic album editing program for operating a computer as an electronic album editing system having a first storage section for storing a plurality of images captured by a user as an electronic album, a second storage section for storing each one of a plurality of electronic albums containing a plurality of images captured by cameramen other than the user by correlating with traveling routes of the cameramen in the plurality of images contained in the electronic albums, a traveling route calculating section for calculating a traveling route of the user in the plurality of images based on an image capturing sequence and image capturing point of each one of the plurality of images stored in the first storage section, an album detecting section for detecting an electronic album corresponding to a traveling route that presents a degree of coincidence of reference value or more set in advance with respect to the traveling route calculated by the traveling route calculating section out of the plurality of electronic albums stored in the second storage section, and an editing section for editing the electronic album of the user by storing at least a part of the plurality of images contained in the electronic album detected by the album detecting section to the first storage section.

It is noted that the summary of the invention described above does not necessarily describe all necessary features of the invention. The invention may also be a sub-combination of the features described above.

Thus the invention allows the images desired by the user to add to the user's electronic album and related with the images contained in the user's electronic album to be accurately selected and added to the album in editing the user's electronic album by adding the images captured by other cameramen.

DETAILED DESCRIPTION OF THE INVENTION

The invention will now be described based on preferred embodiments, which do not intend to limit the scope of the invention, but exemplify the invention. All of the features and the combinations thereof described in the embodiments are not necessarily essential to the invention.

Figure 1:
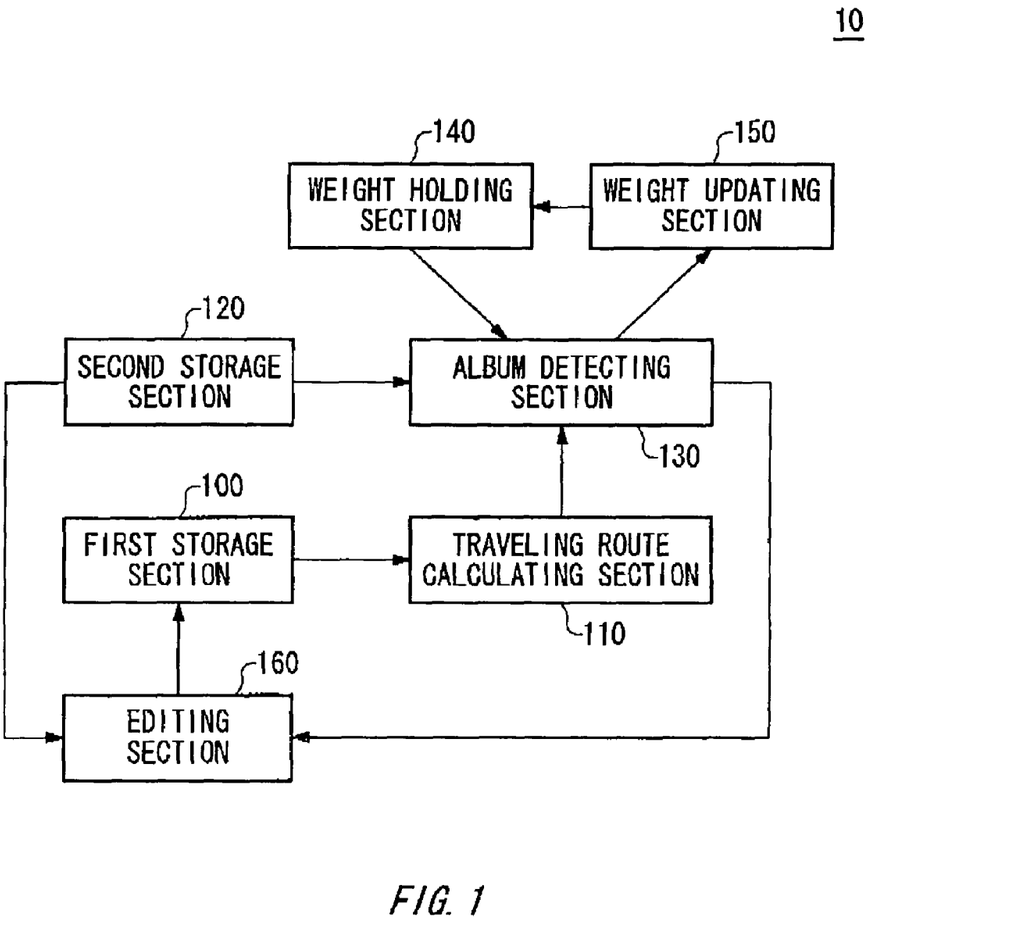
FIG. 1 is a block diagram showing a functional configuration of an electronic album editing system.

FIG. 1 is a block diagram showing one exemplary functional configuration of an electronic album editing system 10 according to one embodiment of the invention. The electronic album editing system 10 has a first storage section 100, a traveling route calculating section 110, a second storage section 120, an album detecting section 130, a weight holding section 140, a weight updating section 150 and an editing section 160. The electronic album editing system 10 edits a user's electronic album by detecting one electronic album out of a plurality of electronic albums of other cameramen other than a user of the system and by adding images contained in the detected electronic album to the user's electronic album.

A purpose of the electronic album editing system 10 of the present embodiment is to edit the user's electronic album by adding the images related with images contained in the user's electronic album by selecting the images to be added to the user's electronic album out of the electronic album corresponding to a similar traveling route with a traveling route of the user's electronic album.

The first storage section 100 stores a plurality of images captured by the user as the electronic album. The first storage section 100 may be a recording medium such as a magnetic storage device such as a hard disk drive, a semiconductor recording device such as a flash memory, an optical recording medium such as a CD-R and the like. The traveling route calculating section 110 calculates the traveling route of the user followed in the plurality of images based on an image capturing sequence and an image capturing point of each one of the plurality of images stored in the first storage section 100. Then, the traveling route calculating section 110 outputs the calculated traveling route to the album detecting section 130.

The second storage section 120 stores the plurality of electronic albums containing the plurality of images captured by the cameramen other than the user. Here, the cameramen of the plurality of electronic albums stored in the second storage section 120 may be a same person with regard at least a part of the electronic albums or may be different persons per each electronic album. The second storage section 120 stores traveling routes of the cameramen of the plurality of images contained in the electronic albums by correlating each one of the plurality of electronic albums. The second storage section 120 may be also a recording medium such as a magnetic storage device such as a hard disk drive, a semiconductor recording device such as a flash memory, an optical recording medium such as a CD-R and the like. The second storage section 120 may be also a server opened in Internet or the like for example.

The album detecting section 130 detects the electronic album corresponding to the traveling route that presents a degree of coincidence of a reference value or more set in advance with respect to the traveling route calculated by the traveling route calculating section 110 out of the plurality of electronic albums stored in the second storage section 120. Then the album detecting section 130 outputs information presenting the detected electronic album to the weight updating section 150 and to the editing section 160. The weight holding section 140 holds weights by correlating with each cameraman of the plurality of electronic albums stored in the second storage section 120. It is noted that the album detecting section 130 may detect the electronic album out of the plurality of electronic albums based on the weight per cameraman held by the weight holding section 140 in detecting the electronic album corresponding to the traveling route that presents the degree of coincidence of the reference value or more with the traveling route of the user. When the album detecting section 130 detects the electronic album, the weight updating section 150 increases the weight held by the weight holding section 140 by correlating with the cameraman of the detected electronic album. Meanwhile, the editing section 160 edits the user's electronic album by reading at least a part of the plurality of images contained in the electronic album detected by the album detecting section 130 out of the second storage section 120 and by storing them in the first storage section 100.

The electronic album editing system 10 of the present embodiment enables the user to edit the user's electronic album by adding images contained in the electronic album of the other cameraman when the user keeps the images altogether as the electronic album. Here, the images to be added to the user's electronic album are not images contained in the electronic album randomly selected among the plurality of electronic albums of the other cameramen but images selected out of the electronic album containing images captured while traveling through the traveling route that presents the degree of coincidence of the reference value or more with the traveling route through which the user traveled while capturing the images contained in the user's electronic album. It is a matter of course that the image captured in the similar traveling route with the traveling route of the user's electronic album is highly related with the user's electronic album when it has been captured at the point closed to the image capturing point of the image captured by the user. Even if the image has been captured at a point distant from the image capturing point of the image captured by the user, it can be said that the image is highly related with the user's electronic album in a point that the image is highly possibly what has been captured at the point or at the nearby point thereof where the user has passed while traveling and capturing the users' image.

Accordingly, the use of the electronic album editing system 10 enables the user to edit own electronic album by adding the preferable images highly related with the images contained in the user's electronic album while watching the images contained in the electronic albums of the other cameramen without carrying out works of manually selecting the images to be added to own electronic album.

Figure 2:
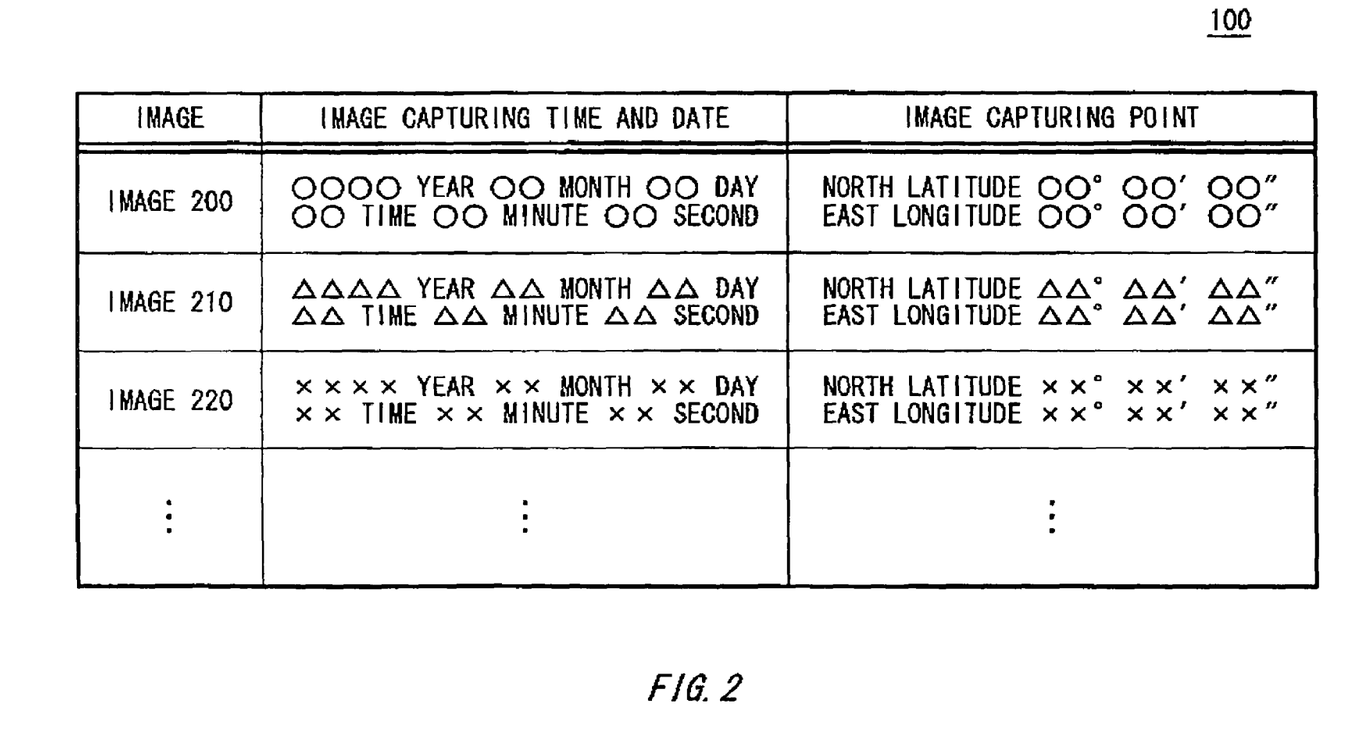
FIG. 2 is a table showing a first storage section.

FIG. 2 is a table showing one example of the first storage section 100 of the embodiment. The first storage section 100 stores a plurality of images captured by the user, or more specifically, images 200, 210, 220 and so on. In addition to them, the first storage section 100 stores time and date when the image has been captured and a point where the image has been captured, or more specifically, latitude and longitude of the image capturing point, by correlating with each image. The traveling route calculating section 110 detects an image capturing sequence of the plurality of images based on the image capturing time and date of each of the plurality of images. The traveling route calculating section 110 may calculate the traveling route of the user in the plurality of images by specifying each one of the image capturing points of the plurality of images as a starting point, an arbitrary number of relay points and an ending point in the traveling route in accordance to the detected image capturing sequence.

Figure 3:
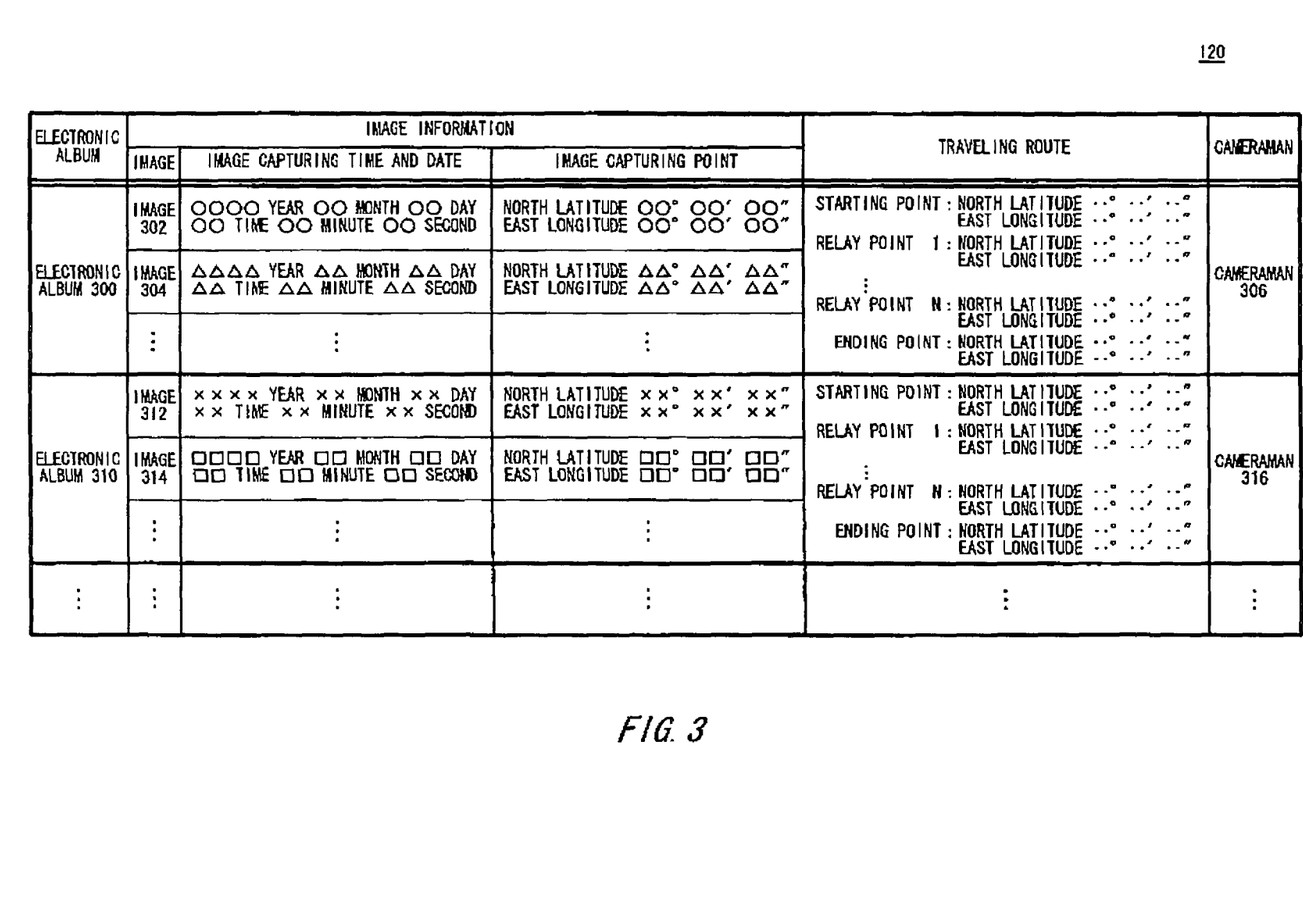
FIG. 3 is a table showing a second storage section.

FIG. 3 is a table showing one example of the second storage section 120 of the embodiment. The second storage section 120 stores the plurality of electronic albums of the cameramen other than the user, or more specifically, the electronic albums 300, 310 and so on. The second storage section 120 stores the plurality of images contained in each one of the plurality of albums. More specifically, the second storage section 120 stores images 302, 304 and so on as the images contained in the electronic album 300 and stores images 312, 314 and so on as the images contained in the electronic album 310. Here, the second storage section 120 stores the image capturing time and date as well as the image capturing point, or specifically, latitude and longitude of the point by correlating with each image.

In addition to them, the second storage section 120 stores traveling routes of the cameramen of the plurality of images contained in the electronic albums by correlating with each one of the pluralities of electronic albums. For example, the second storage section 120 may store the traveling route in which each image capturing point in the plurality of images is set as a starting point, as a relay point of arbitrary number or as an ending point in accordance to the image capturing sequence. It is noted that the second storage section 120 is not always necessary to store the traveling route of the cameraman of the electronic album in advance by correlating with each one of the electronic albums and the traveling route may be calculated every time when the album detecting section 130 detects the electronic album based on the image capturing time and date and on the image capturing point of each image. However, because the second storage section 120 calculates and stores the traveling route of the electronic album in advance as shown in the figure, the album detecting section 130 can detect the electronic album in a short tome as compared to a case of calculating the traveling route in the electronic album every time when the album detecting section 130 detects the electronic album.

The second storage section 120 also stores information for identifying the cameraman of the electronic album by correlating with each one of the pluralities of electronic albums. For example, the second storage section 120 stores the cameraman 306 as the information identifying the cameraman of the electronic album 300 and the cameraman 316 as the information for identifying the cameraman of the electronic album 310. It is noted that the weight holding section 140 may store the same information with the information stored in the second storage section 120 for identifying each cameraman and the weight of the cameraman by correlating from each other.

Figure 4:
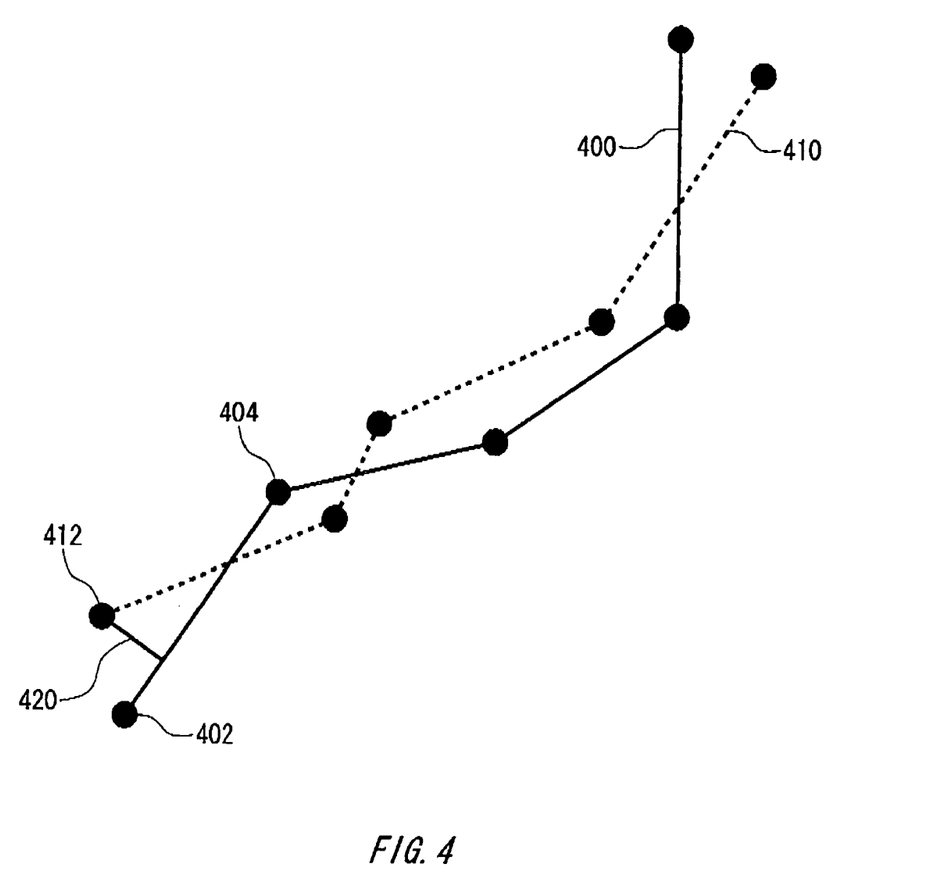
FIG. 4 is a diagrammatic view showing processes in album detecting section.

FIG. 4 is a diagrammatic view showing exemplary processes in the album detecting section 130 of the present embodiment. In the figure, a traveling route 400 represents the traveling route of the user followed in the plurality of images contained in the user's electronic album and calculated by the traveling route calculating section 110. A traveling route 410 represents a traveling route stored in the second storage section 120 by correlating with one electronic album. Suppose here that each traveling route contains a plurality of image capturing points in terms of the images contained in each electronic album as explained in connection with FIGS. 2 and 3.

For each point contained in the traveling route 410, the album detecting section 130 calculates a distance between the point and a route closest to the point among a plurality of routes connecting foregoing and back points contained in the traveling route 400. For example, the album detecting section 130 calculates a distance 420 between Point 412 contained in the traveling route 410 and a route connecting Points 402 and 404, which is the route closest to Point 412 among the plurality of routes contained in the traveling route 400. The album detecting section 130 also calculates distances between other points contained in the traveling route 410 and the routes contained in the traveling route 400 in the same manner. Then, the album detecting section 130 calculates a sum of squares of the distances calculated with respect to the respective points. An inverse number of the calculated sum of squares here is one example of a degree of coincidence between the traveling route 400 and the traveling route 410. The album detecting section 130 also calculates the sum of squares described above for each one of the plurality of electronic albums contained in the second storage section 120.

Then, the album detecting section 130 detects an electronic album whose calculated sum of squares is least as the electronic album corresponding to the traveling route having the highest degree of coincidence with the traveling route 400 of the user's electronic album, i.e., as the electronic album from which images to be added to the user's electronic album are selected. Here, the album detecting section 130 may detect the electronic album only when the calculated sum of squares is a reference value or less set in advance, i.e., only when the degree of coincidence represented by the inverse number of the sum of squares is the reference value or more set in advance. It is noted that the preset reference value of the sum of squares may be an upper limit value of the sum of squares of the distances between the traveling route in the user's electronic album and the traveling route in one electronic album stored in the second storage section 120 in which the user judges that highly related images may be captured in the respective traveling routes, and may be set in advance by the user and others.

Further, in detecting one electronic album stored in the second storage section 120 as the electronic album out of which the images to be added to the user's electronic album are selected, the album detecting section 130 may detect one electronic album not only when the degree of coincidence between the traveling route in one electronic album and the traveling route in the user's electronic album and calculated by the traveling route calculating section 110 is the reference value or more, but also when a degree of coincidence between a period during which the plurality of images contained in one electronic album has been captured and a period during which the plurality of images contained in the user's electronic album and stored in the first storage section 100 has been captured is a reference value or more set in advance.

For example, the album detecting section 130 calculates the period during which the plurality of images has been captured based on the image capturing time and date stored in the first storage section 100 by correlating with each one of the plurality of images contained in the user's electronic album. Still more, the album detecting section 130 calculates the period during which the plurality of images has been captured based on the image capturing time and date stored in the second storage section 120 by correlating with each one of the plurality of images contained in one electronic album. Then, the album detecting section 130 detects a period that overlaps with the period calculated with respect to the user's electronic album among the periods calculated with respect to one electronic album and calculates a rate of the detected period to the whole period calculated with respect to one electronic album. Here, the rate calculated by the album detecting section 130 is one example of the degree of coincidence between the periods during which the images in one electronic album and in the user's electronic album have been captured. Then, the album detecting section 130 detects one electronic album when the calculated rate is the reference value or more set in advance. Here, the preset reference value of the calculated rate may be a lower limit value of the rate of overlapped period during which the images contained in the user's electronic album and the images contained in one electronic album have been captured and during which the user judges that they are highly related. The user may set it in advance as 0.7 for example.

In detecting the electronic album out of which the images to be added to the user's electronic album are selected, the electronic album editing system 10 of the present embodiment allows the images highly related with the images contained in the user's electronic album, such as images captured in the same season or images captured by a person who traveled together, to be accurately selected and to be added to the user's electronic album by judging not only the degree of coincidence of the traveling routes but also the degree of coincidence of the image capturing periods.

Still more, the album detecting section 130 may detect an electronic album, from the weight holding section 140, whose weight corresponding to a cameraman of each electronic album is largest among the plurality of electronic albums corresponding to the traveling routes that present the degree of coincidence of the preset reference value or more with respect to the traveling route calculated by the traveling route calculating section 110 and contained in the plurality of electronic albums stored in the second storage section 120 and may select the detected electronic album as the electronic album out of which the images to be added to the user's electronic album are selected. Here, the album detecting section 130 may present the information presenting the plurality of electronic albums corresponding to the traveling routes that present the degree of coincidence of the reference value or more with respect to the traveling route of the user by displaying them on a display device provided in the electronic album editing system 10 to let the user specify the images to be selected out of the plurality of electronic albums and to be added to the user's electronic album.

The electronic album editing system 10 of the present embodiment also allows the electronic album of the cameraman previously designated by the user as being a cameraman who captured the images in the traveling route having a high degree of coincidence or as containing images suitable to be added to the user's electronic album to be preferentially detected as the electronic album out of which the images to be added to the user's electronic album are selected. Thereby, even in a case when the electronic album editing system 10 automatically detects the electronic album out of which the images to be added to the user's electronic album are selected, the electronic album editing system 10 can accurately detect the electronic album containing the images suitable to be added to the user's electronic album.

Figure 5A:
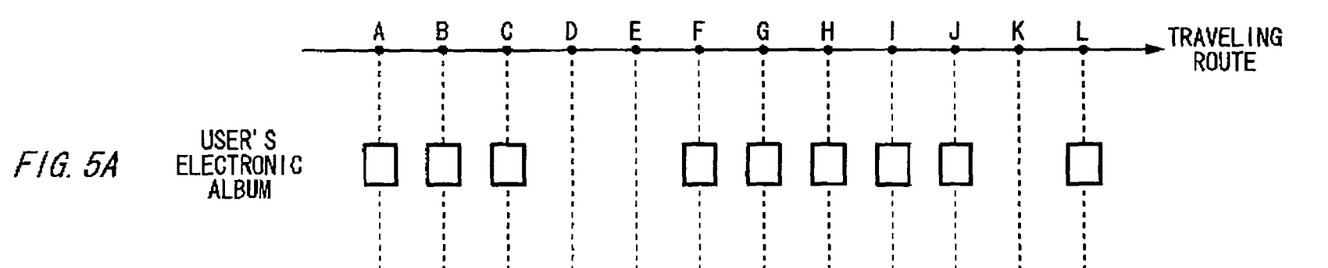
FIG. 5 is a chart showing processes in an editing section.
Figure 5B:
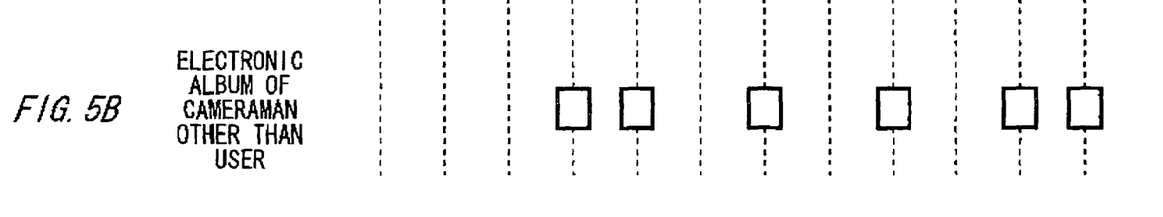

FIG. 5 is a chart showing one exemplary process in the editing section 160 of the embodiment. This chart explains one exemplary process for selecting the images to be added to the user's electronic album out of the electronic album detected by the album detecting section 130. FIG. 5A shows the images contained in the user's electronic album per image capturing point along the traveling route. FIG. 5B shows the images contained in the electronic album of the cameraman other than the user and detected by the album detecting section 130 per image capturing point (A through L) along the traveling route.

In FIG. 5B, the image, among the images contained in the detected electronic album, captured at point distant from an image capturing point of either one image contained in the user's electronic album by a distance below a value set in advance is indicated at the pertinent image capturing point like Point G for example. Still more, in FIG. 5B, the image, among the images contained in the detected electronic album, captured at point distant from an image capturing point of either one image contained in the user's electronic album by a distance above the value set in advance is indicated between image capturing points of two images contained in the user's electronic album closest to the image capturing point of the image like Point D for example. Here, the distance set in advance may be an upper limit value of the distance between the respective image capturing points, where the user judges that contents of the respective images would highly resemble each other because the image contained in the user's electronic album and the image contained in the detected electronic album were captured at the close points, and may be set by the user in advance like 300 meters for example.

Then, the editing section 160 stores the images, captured at points distant from the image capturing points of all of the images stored in the first storage section 100 by a distance more than the value set in advance, among the plurality of images contained in the electronic album detected by the album detecting section 130, to the first storage section 100 to edit the user's electronic album. In concrete, the editing section 160 selects each image captured at Points D, E and K, among the images contained in the electronic album detected by the album detecting section 130 shown in FIG. 5B, in which no image captured at points close to each other is contained in the user's electronic album, and stores the selected images to the first storage section 100. The editing section 160 may also display the contents shown in this figure on a display device provided in the electronic album editing system 10 to let the user specify the images to be added to the electronic album.

When an image captured in the vicinity of the image capturing point of the image contained in the user's electronic album is selected as the image to be added to the user's electronic album, an image that resembles with the image already contained in the electronic album might be selected. However, the electronic album editing system 10 of the present embodiment allows the image captured at the point distant from the image capturing point of the image contained in the user's electronic album to be selected, though their traveling routes are alike, in selecting the image out of the electronic album of the cameraman other than the user. It then allows the image that does not resemble so much with the image contained in the user's electronic album, though it may be highly related, such as an image that the user missed to capture during traveling, and that can enhance the diversity of contents of the electronic album to be selected and added to the user's electronic album.

Figure 6:
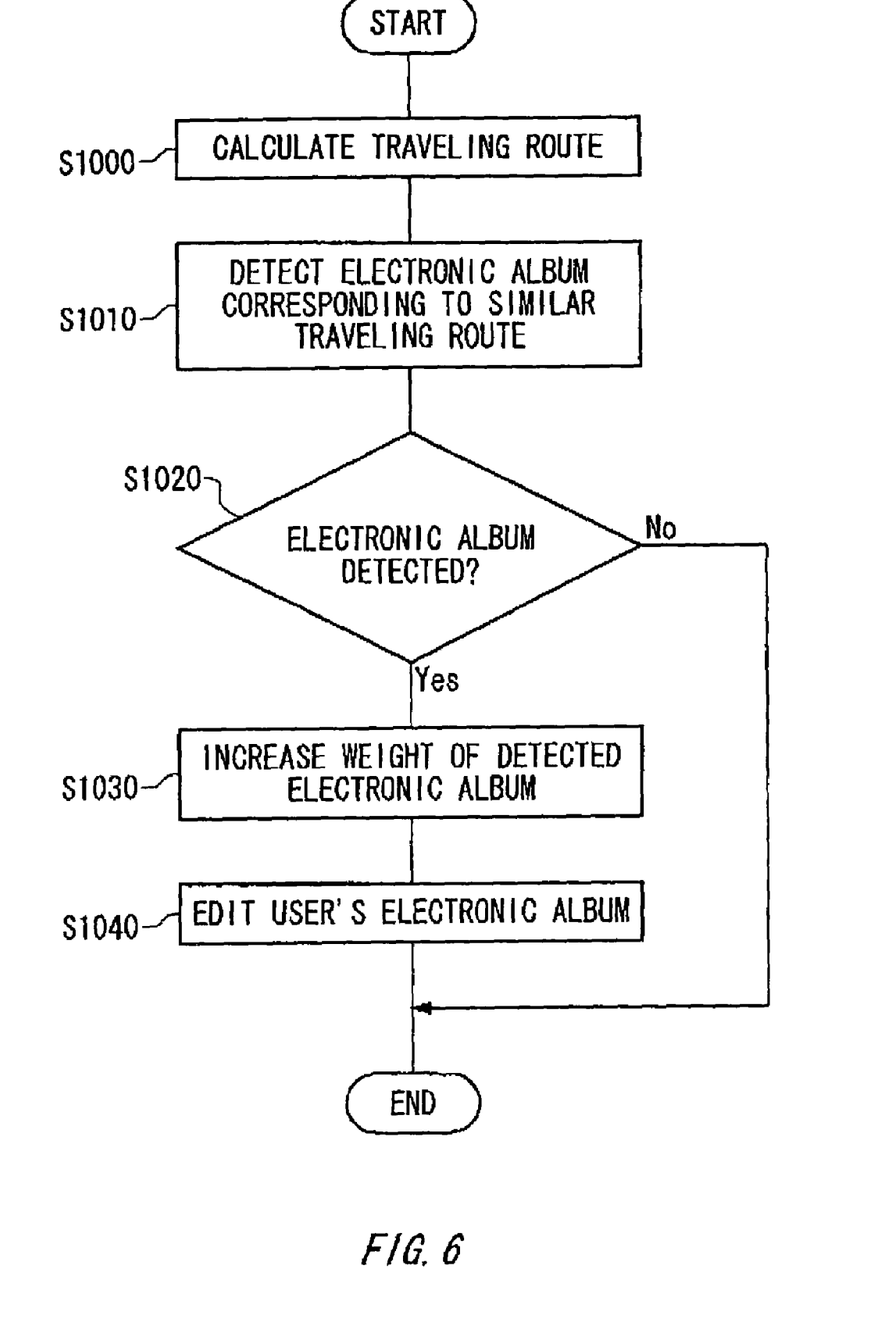
FIG. 6 is a flowchart showing a flow of processes in the electronic album editing system.

FIG. 6 is a flowchart showing one exemplary flow of process in the electronic album editing system 10 of the embodiment. At first, the traveling route calculating section 110 calculates the traveling route of the user in the plurality of images based on the image capturing sequence and image capturing point in each one of the plurality of images contained in the user's electronic album and stored in the first storage section 100 in Step S1000. Then, the album detecting section 130 detects the electronic album, out of the plurality of electronic albums stored in the second storage section 120, that corresponds to a traveling route presenting the degree of coincidence of the reference value or more set in advance with respect to the traveling route calculated by the traveling route calculating section 110 in Step S1010. Here, the album detecting section 130 may detect the electronic album based further on the weight per cameraman in the electronic album held by the weight holding section 140. Then, the album detecting section 130 judges whether or not it could detect the electronic album corresponding to the traveling route presenting the degree of coincidence of the reference value or more to the traveling route of the user in Step S1020. When it is judged that the album detecting section 130 has detected the electronic album (Yes in Step S1020), the weight updating section 150 increases the weight held by the weight holding section 140 by correlating with the cameraman of the detected electronic album in Step S1030. Then, the editing section 160 reads at least a part of the plurality of images contained in the electronic album detected by the album detecting section 130 out of the second storage section 120 and stores them in the first storage section 100 to edit the user's electronic album in Step S1040.

Figure 7:
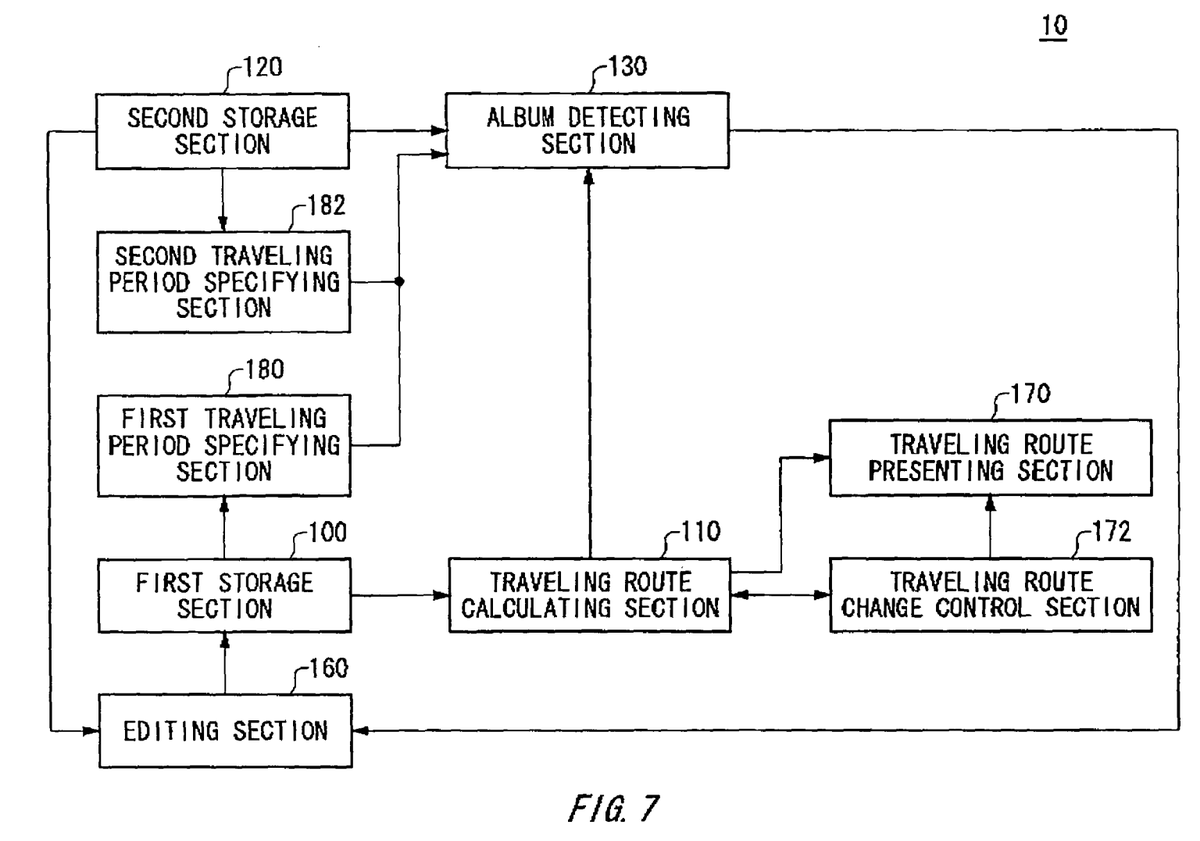
FIG. 7 is a block diagram showing a functional configuration of an electronic album editing system according to another embodiment.

FIG. 7 is a block diagram showing a functional configuration of the electronic album editing system 10 according to another embodiment. The electronic album editing system 10 of this embodiment has a traveling route presenting section 170, a traveling route change control section 172, a first traveling period specifying section 180 and a second traveling period specifying section 182. It is noted that the electronic album editing system 10 of the present embodiment may have a part or whole of the configuration and function of the electronic album editing system 10 explained above in connection with FIGS. 1 through 6. The traveling route calculating section 110 outputs the calculated traveling route to the traveling route presenting section 170 and to the traveling route change control section 172. The traveling route presenting section 170 presents the traveling route received from the traveling route calculating section 110 to the user. In concrete, the traveling route presenting section 170 displays the traveling route of the user to a display section such as a monitor so that the user can visually recognize the traveling route. For example, the traveling route presenting section 170 may display a map of an area containing the traveling route so as to display points indicating the image capturing points in the traveling route while overlapping with the map. The traveling route presenting section 170 may also display the traveling route by connecting the plurality of image capturing points in the traveling route by lines for example.

The traveling route change control section 172 enables the user to change the traveling route presented by the traveling route presenting section 170. In concrete, the traveling route change control section 172 may change the traveling route by enabling the user to change at least a part of the image capturing points in the traveling route of the user calculated by the traveling route calculating section 110. For example, the traveling route change control section 172 may change the traveling route by enabling the user to move the image capturing points in the traveling route presented by the traveling route presenting section 170 to points desired by the user. The traveling route change control section 172 outputs the traveling route changed by the user to the traveling route presenting section 170 so that the traveling route presenting section 170 displays the changed traveling route. The traveling route change control section 172 outputs the changed traveling route also to the traveling route calculating section 110. The traveling route calculating section 110 outputs the changed traveling route received from the traveling route change control section 172 to the album detecting section 130.

The album detecting section 130 detects an electronic album, out of the plurality of electronic albums stored in the second storage section 120, corresponding to a traveling route presenting a degree of coincidence of the reference value or more set in advance with respect to the traveling route changed by the traveling route change control section 172. Then, the editing section 160 stores at least a part of the plurality of images contained in the electronic album detected by the album detecting section 130 to the first storage section 100.

The electronic album editing system 10 of the present embodiment allows the traveling route to be changed by presenting the traveling route of the user and by enabling the user to change the image capturing points in the presented traveling route. It then allows the electronic album corresponding to the changed traveling route to be detected based on the changed traveling route and the images contained in the detected electronic album to be stored in the user's electronic album. Thus, it can increase the satisfaction of the user because it allows the image at the point where the user wanted to capture but could not to be stored in the user's electronic album.

Furthermore, the first storage section 100 outputs the image capturing time and date stored by correlating with the image to the first traveling period specifying section 180 based on a control of the first traveling period specifying section 180. The second storage section 120 outputs the image capturing time and date stored by correlating with the image to the second traveling period specifying section 182 based on a control of the second traveling period specifying section 182. Then, suppose a case when the album detecting section 130 detects a plurality of electronic albums, out of the plurality of electronic albums stored in the second storage section 120, corresponding to a traveling route presenting a degree of coincidence of the reference value or more set in advance with respect to the traveling route calculated by the traveling route calculating section 110. In such a case, the first traveling period specifying section 180 receives the image capturing time and date stored by correlating with the image by the first storage section 100. Then, the first traveling period specifying section 180 specifies a period during which the user traveled through the traveling route calculated by the traveling route calculating section 110 from the image capturing time and date received from the first storage section 100.

In concrete, when the album detecting section 130 detects the plurality of electronic albums corresponding to the traveling route presenting the degree of coincidence of the reference value or more set in advance with respect to the traveling route calculated by the traveling route calculating section 110, the album detecting section 130 feeds the information on the traveling route calculated by the traveling route calculating section 110 to the first traveling period specifying section 180 to work on the first traveling period specifying section 180 so that it specifies the traveling period during which the user traveled through the traveling route. The first traveling period specifying section 180 specifies the image capturing time and date stored by the first storage section 100 by correlating with the image used by the traveling route calculating section 110 in calculating the traveling route from the received information on the traveling route. Then, the first traveling period specifying section 180 specifies the traveling period during which the user traveled through the traveling route from the specified image capturing time and date. The traveling period may be specified in unit of Month, Day and Year as well as Time and Minute.

The second traveling period specifying section 182 specifies a traveling period during which the cameraman traveled through the traveling route stored in the second storage section 120 by correlating with the images contained in the electronic album detected by the album detecting section 130 from the image capturing time and date also stored by correlating with the images in the second storage section 120 and records it by correlating with the electronic album. In concrete, when the album detecting section 130 detects the plurality of electronic albums corresponding to the traveling route presenting the degree of coincidence of the reference value or more set in advance with respect to the traveling route calculated by the traveling route calculating section 110, the album detecting section 130 feeds the information on the detected electronic album to the second traveling period specifying section 182 to work on the second traveling period specifying section 182 so that it specifies the traveling period during which the cameraman traveled through the traveling route stored in the second storage section 120 by correlating with the images contained in the electronic album. The second traveling period specifying section 182 specifies the image capturing time and date stored in the second storage section 120 by correlating with the images contained in the electronic album from the received information on the electronic album. Then, the second traveling period specifying section 182 specifies the traveling period during which the cameraman traveled through the traveling route from the specified image capturing time and date.

The first traveling period specifying section 180 and the second traveling period specifying section 182 output the specified traveling periods of the user and the cameraman to the album detecting section 130, respectively. Then, the album detecting section 130 detects the electronic album stored in the second storage section 120 by correlating with the traveling route recorded by correlating with the traveling period specified by the second traveling period specifying section 182, which is closest to the traveling period specified by the first traveling period specifying section 180, among the plurality of electronic albums detected by the album detecting section 130. Next, the editing section 160 edits the user's electronic album by storing at least a part of the plurality of images contained in the electronic album detected by the album detecting section 130 to the first storage section 100.

When the album detecting section 130 detects the plurality of electronic albums corresponding to the traveling route presenting the degree of coincidence of the reference value or more set in advance with respect to the traveling route of the user, the electronic album editing system 10 of the present embodiment allows the electronic album corresponding to the traveling period during which the cameraman traveled and which is closest to the traveling period during which the user traveled to be detected and the images stored in the detected electronic album to be captured into the user's electronic album. Thereby, images captured during a traveling period which is totally different from the traveling period during which the user traveled through the traveling route will not be stored in the user's electronic album, so that it becomes possible to avoid an electronic album from being prepared that would otherwise give a sense of incompatibility to the user by taking in the images captured at different periods.

Figure 8:
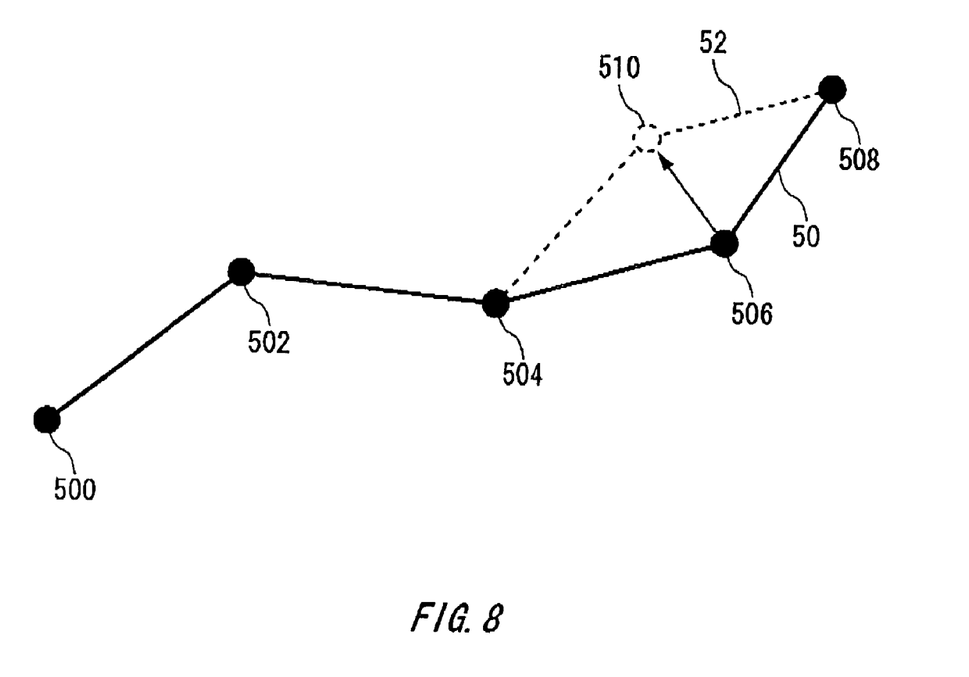
FIG. 8 is a diagrammatic view showing processes in a traveling route change control section.

FIG. 8 is a diagrammatic view showing one exemplary process in the traveling route change control section 172 of the embodiment. The traveling route change control section 172 enables the user to change the traveling route presented by the traveling route presenting section 170. In concrete, the traveling route change control section 172 enables the user to select at least a part of a plurality of image capturing points contained in the traveling route presented by the traveling route presenting section 170. The traveling route change control section 172 may then change the traveling route by moving the image capturing point selected by the user to the point desired by the user within a range of an area presented by the traveling route presenting section 170. For example, suppose a case when the traveling route presenting section 170 has presented a traveling route 50 containing Points 500, 502, 504, 506 and 508 to the user as the traveling route of the user as shown in FIG. 8. Suppose also here that the user wants to have an image captured at Point 510. In such a case, the traveling route change control section 172 changes the traveling route by enabling the user to select Point 506 for example and by moving Point 506 to Point 510. Thereby, the traveling route change control section 172 can change the traveling route from the traveling route 50 to a traveling route 52 that passes through Point 500, 502, 504, 510 and 508.

Figure 9:
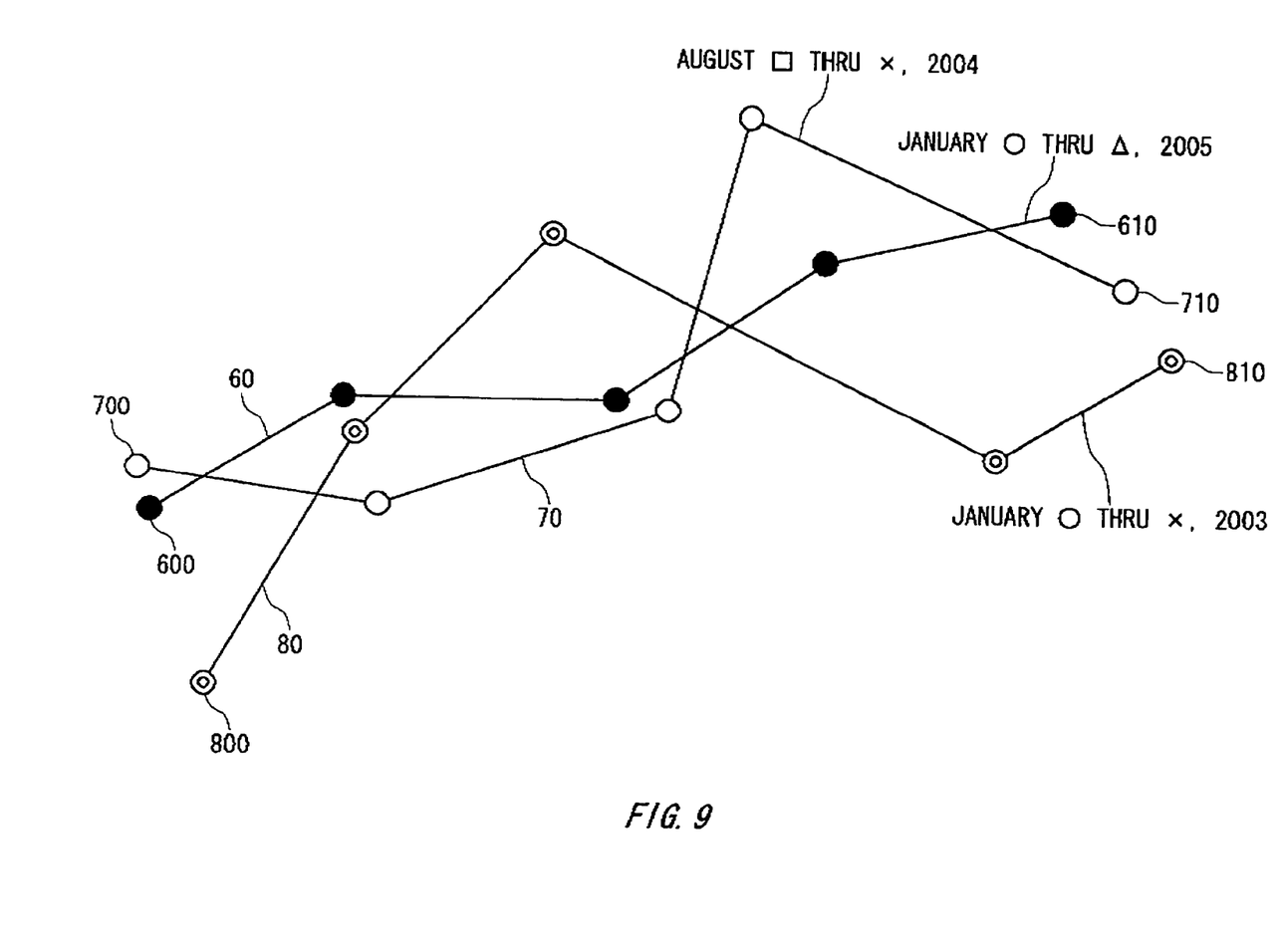
FIG. 9 is a diagrammatic view showing processes in the album detecting section.

FIG. 9 is a diagrammatic view showing one exemplary process in the album detecting section 130 of the present embodiment. Suppose a case when the album detecting section 130 detects a plurality of electronic albums corresponding to the traveling route presenting the degree of coincidence of the reference value or more set in advance with respect to the traveling route calculated by the traveling route calculating section 110 out of the plurality of electronic albums stored in the second storage section 120. For example, suppose that the album detecting section 130 detects traveling routes 70 and 80 as the traveling routes presenting the degree of coincidence of the reference value or more set in advance with respect to a traveling route 60 when the traveling route calculated by the traveling route calculating section 110 is the traveling route 60.

In such a case, the first traveling period specifying section 180 specifies a traveling period during which the user traveled through the traveling route 60 calculated by the traveling route calculating section 110 from image capturing time and date also stored in the first storage section 100 by correlating with images. For example, while the user traveled through the traveling route 60 from Points 600 to 610, the first traveling period specifying section 180 specifies the traveling period during which the user traveled through the traveling route 60 from the image capturing time and date stored in the first storage section 100 by correlating with an image captured at Point 600 and the image capturing time and date stored in the first storage section 100 by correlating with an image captured at Point 610. For example, the first traveling period specifying section 180 specifies the traveling period during which the user traveled through the traveling route 60 like "January o thru Δ, 2005."

Meanwhile, the second traveling period specifying section 182 specifies the traveling periods during which the cameramen traveled through the traveling routes 70 and 80 stored in the second storage section 120 by correlating with images contained in the plurality of electronic albums detected by the album detecting section 130 from the image capturing time and date also stored in the second storage section 120 by correlating with the images. For example, while the user traveled from Points 700 to 710 in the traveling route 70, the second traveling period specifying section 182 specifies the traveling period during which the user traveled through the traveling route 70 from image capturing time and date stored in the second storage section 120 by correlating with an image captured at Point 700 and image capturing time and date stored in the second storage section 120 by correlating with an image captured at Point 710.

Suppose that the second traveling period specifying section 182 specifies the traveling period during which the user traveled through the traveling route 70 is "August ☐ thru x, 2004" for example. The second traveling period specifying section 182 also specifies the traveling period during which the user traveled through the traveling route 80 in the same manner. Suppose that the second traveling period specifying section 182 specifies the traveling period during which the user traveled through the traveling route 80 is "January o thru x, 2003" for example. It is noted that the traveling period may be a range of Month, Day and Year, a range of Hour and Minute or a predetermined period, e.g., a season. For example, based on Month of the traveling period specified by the first traveling period specifying section 180 and the second traveling period specifying section 182, a season corresponding to that Month may be specified as the traveling period.

Then, the album detecting section 130 detects the electronic album stored in the second storage section 120 by correlating with the traveling route recorded by correlating with the traveling period specified by the second traveling period specifying section 182 and closest to the traveling period specified by the first traveling period specifying section 180. For example, the album detecting section 130 may detect the electronic album stored in the second storage section 120 by correlating with the traveling route 80 corresponding to the traveling period closest to the traveling period of the traveling route 60 specified by the first traveling period specifying section 180. Then, the editing section 160 edits the user's electronic album by storing at least a part of the plurality of images contained in the electronic album detected by the album detecting section 130 to the first storage section.

Figure 10:
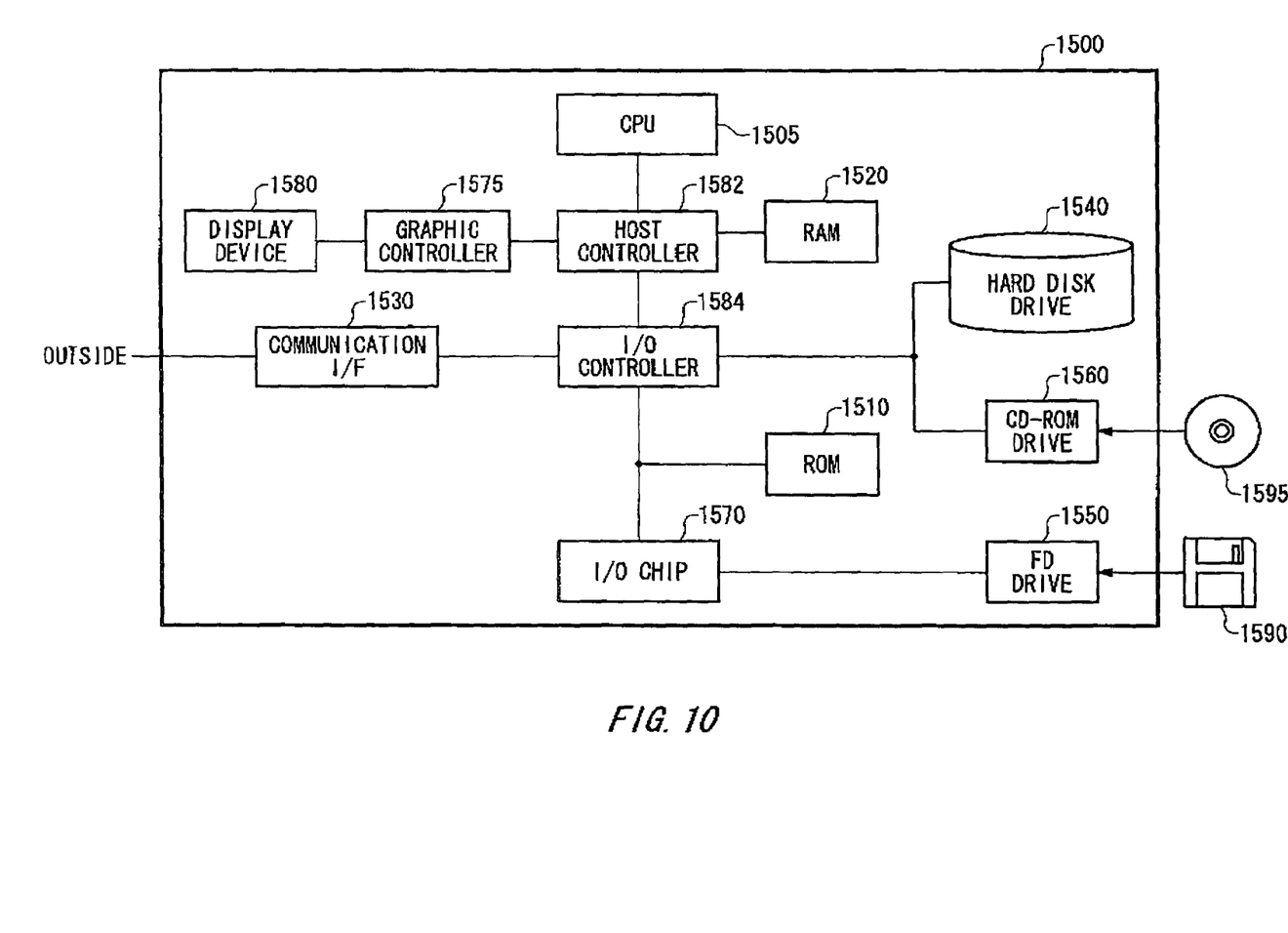
FIG. 10 is a block diagram showing a hardware configuration of a computer.

FIG. 10 is a block diagram showing one exemplary hardware configuration of a computer 1500 of the embodiment. The computer 1500 of the present embodiment has a CPU peripheral section having a CPU 1505, a RAM 1520, a graphic controller 1575 and a display device 1580 mutually connected by a host controller 1582, an input/output section having a communication interface 1530, a hard disk drive 1540 and a CD-ROM drive 1560 connected with the host controller 1582 via an input/output controller 1584 and a legacy input/output section having a ROM 1510, a flexible disk drive 1550 and an input/output chip 1570 connected with the input/output controller 1584.

The host controller 1582 connects the RAM 1520, the CPU 1505 that accesses the RAM 1520 at high transfer rate and the graphic controller 1575. The CPU 1505 operates based on programs stored in the ROM 1510 and the RAM 1520 to control the respective sections. The graphic controller 1575 obtains image data generated by the CPU 1505 and others on a frame buffer provided within the RAM 1520 to display on the display device 1580. Instead of that, the graphic controller 1575 may contain the frame buffer for storing the image data generated by the CPU 1505 and others.

The input/output controller 1584 connects the host controller 1582, the communication interface 1530, which is a relatively fast input/output device, the hard disk drive 1540 and the CD-ROM drive 1560. The communication interface 1530 communicates with other devices via a network. The hard disk drive 1540 stores programs and data used by the CPU 1505 within the computer 1500. The CD-ROM drive 1560 reads the program or data out of the CD-ROM 1595 and provides it to the hard disk drive 1540 via the RAM 1520.

The input/output controller 1584 is connected with the relatively slow input/output devices of the ROM 1510, the flexible disk drive 1550 and the input/output chip 1570. The ROM 1510 stores a boot program executed by the computer 1500 in starting the system and programs and the like dependent on the hardware of the computer 1500. The flexible disk drive 1550 reads a program or data out of a flexible disk 1590 and provides it to the hard disk drive 1540 via the RAM 1520. The input/output chip 1570 connects the flexible disk drive 1550 with the various input/output devices via parallel ports, serial ports, keyboard ports, mouse ports and the like.

An electronic album editing program provided to the hard disk drive 1540 via the RAM 1520 is stored in the flexible disk 1590, the CD-ROM 1595 or the recording medium such as an IC card to be provided to the user. The electronic album editing program is read out of the recording medium to be installed to the hard disk drive 1540 within the computer 1500 via the RAM 1520 and to be executed in the CPU 1505. The electronic album editing program installed and executed in the computer 1500 works on the CPU 1505 and others to operate the computer 1500 as the electronic album editing system 10 explained in connection with FIGS. 1 through 9.

The program described above may be stored in an outside recording medium. Beside the flexible disk 1590 and the CD-ROM 1595, an optical recording medium such as DVD and PD, a taped medium, a semiconductor memory such as an IC card may be used as the recording medium. Still more, a hard disk provided in a server system connected with a private communication network or Internet, or a storage unit such as a RAM may be used as the recording medium and the program may be provided to the computer 1500 via the network.

Although the invention has been described by way of the exemplary embodiments, it should be understood that those skilled in the art might make many changes and substitutions without departing from the spirit and scope of the invention.

It is obvious from the definition of the appended claims that the embodiments with such modifications also belong to the scope of the invention.

What is claimed is:

1. An electronic album editing system, comprising:
   a first storage section for storing a plurality of images captured by a user as an electronic album;
   a second storage section for storing each one of a plurality of electronic albums containing a plurality of images captured by cameramen other than said user by correlating with traveling routes of said cameramen in said plurality of images contained in said electronic albums;
   a traveling route calculating section for calculating a traveling route of said user in said plurality of images based on an image capturing sequence and image capturing point of each one of said plurality of images stored in said first storage section;
   an album detecting section for detecting an electronic album, out of said plurality of electronic albums stored in said second storage section, corresponding to a traveling route that presents a degree of coincidence of a reference value or more set in advance with respect to the traveling route calculated by said traveling route calculating section; and
   an editing section for editing said electronic album of said user by storing at least a part of the plurality of images contained in said electronic album detected by said album detecting section to said first storage section.

2. The electronic album editing system as set forth in claim 1, wherein said editing section edits said user's electronic album by storing images, among a plurality of images contained in the electronic album detected by said album detecting section, captured at points distant from image capturing points of all images stored in said first storage section by a preset distance or more to said first storage section.

3. The electronic album editing system as set forth in claim 1, wherein said album detecting section detects one electronic album in the plurality of electronic albums stored in said second storage section when a degree of coincidence of a traveling route stored in said second storage section by correlating with one electronic album with a traveling route calculated by said traveling route calculating section is reference value or more set in advance and a degree of coincidence of a period during which the plurality of images contained in one electronic album has been captured with a period during which the plurality of images stored in said first storage section has been captured is a reference value or more set in advance.

4. The electronic album editing system as set forth in claim 1, further comprising:
   a weight holding section for holding weights by correlating with each one of said cameramen in the plurality of electronic albums stored in said second storage section; and
   a weight updating section for increasing, when said album detecting section detects one electronic album, said weight held by said weight holding section by correlating with said cameraman of said detected electronic album; wherein
   said album detecting section detects, out of said weight holding section, the electronic album whose weight corresponding to said cameraman of each electronic album is largest among the plurality of electronic albums, stored in said second storage section, corresponding to the traveling route presenting the degree of coincidence of the reference value or more set in advance with respect to the traveling route calculated by said traveling route calculating section.

5. The electronic album editing system as set forth in claim 1, further comprising:
   a traveling route presenting section for presenting the traveling route calculated by said traveling route calculating section to the user; and
   a traveling route change control section for changing the traveling route presented by said traveling route presenting section by an instruction from the user; wherein
   said album detecting section detects the electronic album that corresponds to the traveling route presenting a degree of coincidence of the reference value or more set in advance with respect to the traveling route changed by said traveling route change control section out of the plurality of electronic albums stored in said second storage section.

6. The electronic album editing system as set forth in claim 1, further comprising:
   a first traveling period specifying section for specifying a traveling period during which the user traveled through the traveling route calculated by said traveling route calculating section from image capturing time and date further stored in said first storage section by correlating with an image, when said album detecting section detects a plurality of electronic albums corresponding to the traveling route presenting the degree of coincidence of the reference value or more set in advance with respect to the traveling route calculated by said traveling route calculating section out of the plurality of electronic albums stored in said second storage section; and a second traveling period specifying section for specifying a traveling period during which said cameraman traveled though the traveling route stored in said second storage section by correlating with an image contained in the electronic album detected by said album detecting section from image capturing time and date further stored in said second storage section by correlating with an image to record by correlating with said electronic album; wherein said album detecting section detects the electronic album stored in said second storage section by correlating with the traveling route recorded by correlating with the traveling period specified by said second traveling period specifying section and closest to the traveling period specified by said first traveling period specifying section among said plurality of electronic albums detected by said album detecting section.

7. An electronic album editing method for editing an electronic album containing a plurality of images; wherein a first storage section stores a plurality of images captured by a user as the electronic album; and a second storage section stores each one of a plurality of electronic albums containing a plurality of images captured by cameramen other than said user by correlating with traveling routes of said cameramen in said plurality of images contained in said electronic albums; and said electronic album editing method comprising:

a traveling route calculating step of calculating a traveling route of said user in said plurality of images based on an image capturing sequence and image capturing point of each one of said plurality of images stored in said first storage section;

an album detecting step of detecting an electronic album corresponding to a traveling route that presents a degree of coincidence of a reference value or more set in advance with respect to the traveling route calculated in said traveling route calculating step out of said plurality of electronic albums stored in said second storage section; and an editing step of editing said electronic album of said user by storing at least a part of the plurality of images contained in said electronic album detected in said album detecting step to said first storage section.

8. A computer readable media containing an electronic album editing program for operating a computer as an electronic album editing system, comprising:

a first storage section for storing a plurality of images captured by a user as an electronic album;

a second storage section for storing each one of a plurality of electronic albums containing a plurality of images captured by cameramen other than said user by correlating with traveling routes of said cameramen in said plurality of images contained in said electronic albums;

a traveling route calculating section for calculating a traveling route of said user in said plurality of images based on an image capturing sequence and image capturing point of each one of said plurality of images stored in said first storage section;

an album detecting section for detecting an electronic album corresponding to a traveling route that presents a degree of coincidence of reference value or more set in advance with respect to the traveling route calculated by said traveling route calculating section out of said plurality of electronic albums stored in said second storage section; and an editing section for editing said electronic album of said user by storing at least a part of the plurality of images contained in said electronic album detected by said album detecting section to said first storage section.

* * * * *